US010282418B2

United States Patent
Ishikawa et al.

(10) Patent No.: US 10,282,418 B2
(45) Date of Patent: *May 7, 2019

(54) SUPPORTING INTERACTIVE TEXT MINING PROCESS WITH NATURAL LANGUAGE AND DIALOG

(71) Applicant: International Business Machines Corporation, Armonk, NY (US)

(72) Inventors: Shunsuke Ishikawa, Tokyo (JP); Hiroaki Kikuchi, Kanagawa (JP); Masaki Komedani, Kanagawa (JP); Yutaka Moriya, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,838

(22) Filed: Jun. 19, 2017

(65) Prior Publication Data

US 2018/0285341 A1 Oct. 4, 2018

Related U.S. Application Data

(63) Continuation of application No. 15/473,949, filed on Mar. 30, 2017, now Pat. No. 9,996,527.

(51) Int. Cl.
*G06F 17/00* (2006.01)
*G06F 17/27* (2006.01)
*G06F 17/30* (2006.01)

(52) U.S. Cl.
CPC ........ *G06F 17/278* (2013.01); *G06F 17/2715* (2013.01); *G06F 17/30011* (2013.01); *G06F 17/30684* (2013.01); *G06F 17/30696* (2013.01)

(58) Field of Classification Search
CPC .................... G06F 17/30637; G06F 17/30654
(Continued)

(56) References Cited

U.S. PATENT DOCUMENTS 6,154,737 A * 11/2000 Inaba ................. G06F 17/3069
707/696
6,374,209 B1 * 4/2002 Yoshimi .............. G06F 17/2745
704/9
(Continued)

FOREIGN PATENT DOCUMENTS

WO WO 2014/049310 A2 4/2014

OTHER PUBLICATIONS

List of IBM Patents or Patent Applications Treated as Related (Appendix P), 2 pages.
(Continued)

*Primary Examiner* — Daniel Abebe
(74) *Attorney, Agent, or Firm* — Stephen R. Tkacs; Stephen J. Walder, Jr.; Diana R. Gerhardt

(57) ABSTRACT

A mechanism is provided in a data processing system comprising at least one processor and at least one memory, the at least one memory comprising instructions executed by the at least one processor to cause the at least one processor to implement a document analysis device for performing a statistical analysis of documents with respect to a facet. An acceptance module accepts a natural language sentence. An extraction module extracts a first facet from the natural language sentence. A statistical analysis module performs a first statistical analysis of a set of documents with respect to the first facet and determines a value of the first facet based on a result of the first statistical analysis responsive to information being extracted from the natural language sentence, the information requesting for a second statistical analysis. The statistical analysis module performs the sec- (Continued)

ond statistical analysis of the set of documents using the value of the first facet. A user interface presents a second facet determined based on a result of the second statistical analysis.

10 Claims, 8 Drawing Sheets

(58) Field of Classification Search
USPC .......................................................... 707/713
See application file for complete search history.

(56) References Cited

U.S. PATENT DOCUMENTS

| | | | |
|---|---|---|---|
| 6,532,469 B1 * | 3/2003 | Feldman | G06F 17/30011 |
| | | | 707/750 |
| 6,757,676 B1 | 6/2004 | Sugaya et al. | |
| 7,287,025 B2 | 10/2007 | Wen et al. | |
| 7,315,861 B2 | 1/2008 | Seibel et al. | |
| 8,275,803 B2 | 9/2012 | Brown et al. | |
| 9,208,217 B2 | 12/2015 | Milward et al. | |
| 9,424,344 B2 | 8/2016 | Kothuvatiparambil et al. | |
| 2006/0200342 A1 | 9/2006 | Corston-Oliver et al. | |
| 2008/0077582 A1 | 3/2008 | Reed | |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0096909 A1 | 4/2013 | Brun et al. | |
| 2013/0115192 A1 | 5/2013 | Ali et al. | |
| 2013/0144605 A1 | 6/2013 | Brager et al. | |
| 2015/0356152 A1 | 12/2015 | Tsuchida et al. | |

OTHER PUBLICATIONS

"IBM Watson Analytics cloud-based data analysis tool", IBM Corporation, http://www-01.ibm.com/software/jp/cmp/watsonanalytics/, IBM Watson, retrieved from the internet Oct. 4, 2016, 6 pages.

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Rak, Rafal et al., "Argo: an Integrative, interactive, text mining-based workbench supporting curation", Oxford Journals, http://database.oxfordjournals.org/content/2012/bas010.full, Database, vol. 2012, Jan. 13, 2012, 11 pages.

Stavrianou, Anna et al., "Overview and Semantic Issues of Text Mining", SIGMOD Record, vol. 36, No. 3, Sep. 2007, pp. 23-34.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

* cited by examiner

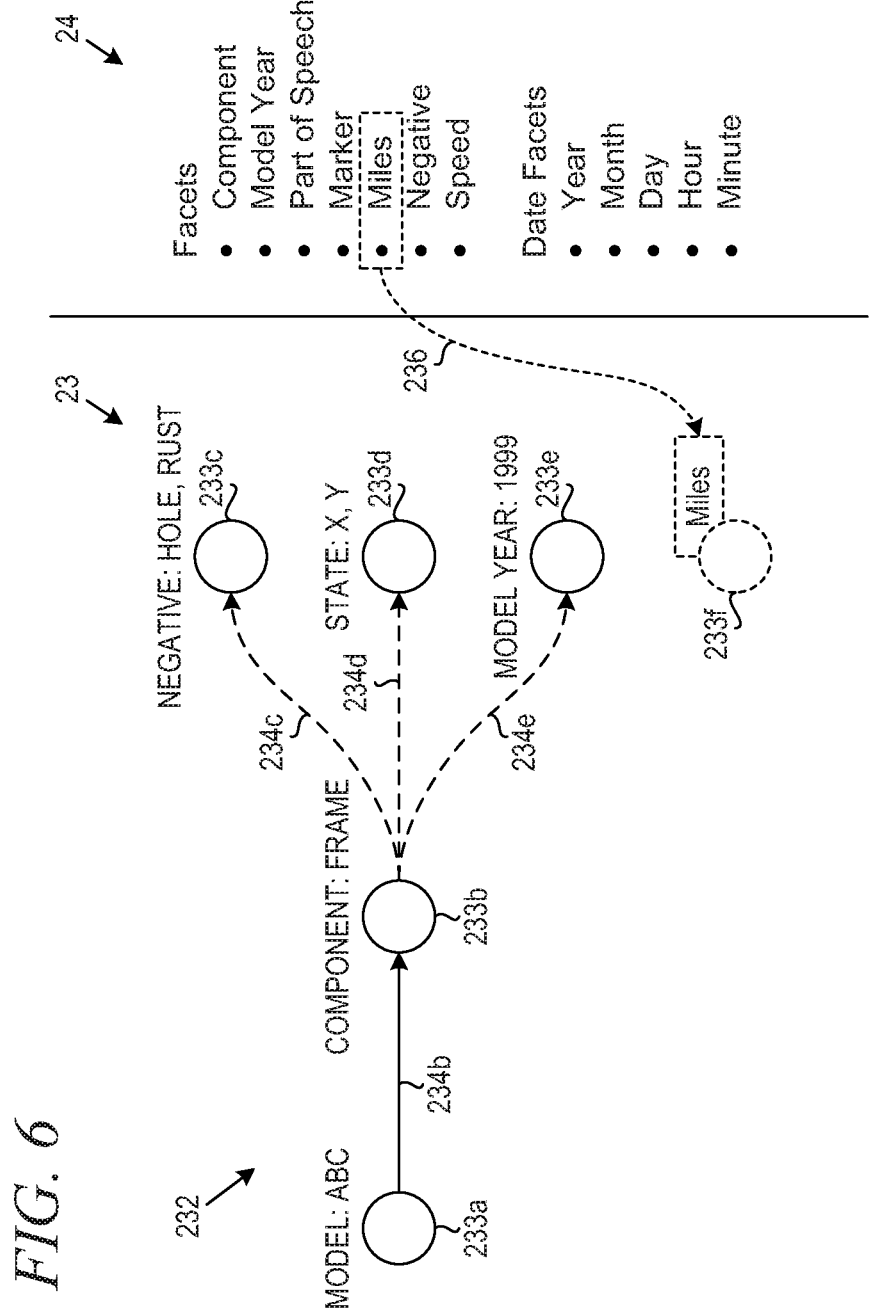

SUPPORTING INTERACTIVE TEXT MINING PROCESS WITH NATURAL LANGUAGE AND DIALOG

BACKGROUND

The present application relates generally to an improved data processing apparatus and method and more specifically to mechanisms for statistical analysis of documents with respect to facet.

Text mining is a technology for acquiring knowledge from a large amount of unstructured text data of documents without necessarily reading the entire content of the documents. A text mining system may analyze the unstructured text data, and extract facets, which are sets of words or phrases representing features of the documents. Further, the text mining system may narrow down the documents with queries (e.g., queries in natural language sentence search, queries in facet search), and perform various statistical analyses of the current documents (the narrowed-down documents) regarding the facets.

To acquire significant results of the text mining, one analysis process is insufficient and two analysis processes need to be executed. The two analysis processes may include the first analysis process of narrowing down documents into interesting documents and identifying words specific to the interesting documents, and the second analysis process of identifying the cause for appearance of the words.

However, since only the first analysis process is conventionally assumed to be executed, a problem arises that a user is not likely to acquire significant results of the text mining.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions executed by the at least one processor to cause the at least one processor to implement a document analysis device for performing a statistical analysis of documents with respect to a facet. The method comprises accepting, by an acceptance module executing within the document analysis device, a natural language sentence. The method further comprises extracting, by an extraction module executing within the document analysis device, a first facet from the natural language sentence. The method further comprises performing, by a statistical analysis module executing within the document analysis device, a first statistical analysis of a set of documents with respect to the first facet. The method further comprises determining, by the statistical analysis module, a value of the first facet based on a result of the first statistical analysis responsive to information being extracted from the natural language sentence, the information requesting for a second statistical analysis. The method further comprises performing, by the statistical analysis module, the second statistical analysis of the set of documents using the value of the first facet. The method further comprises presenting, by a user interface executed by the data processing system, a second facet determined based on a result of the second statistical analysis.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 depicts an example of a facet screen displayed in addition to the mining graph screen in accordance with an illustrative embodiment;

DETAILED DESCRIPTION

Figure 1:
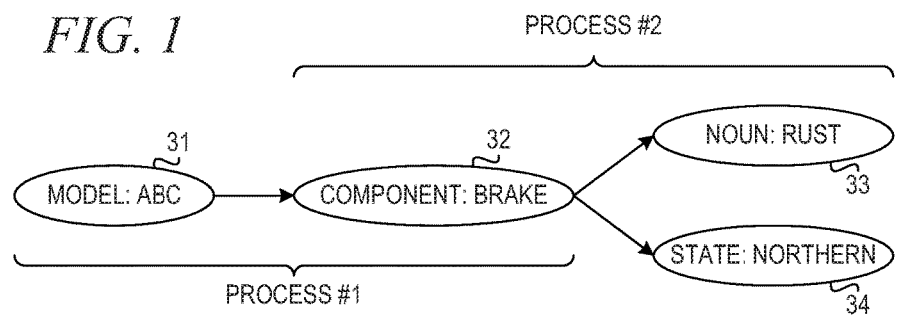
FIG. 1 depicts an example of actual analysis processes.

The illustrative embodiments provide a system and user interface to support for an interactive text mining process with natural language dialog. The system recognizes the user's analysis and performs automatic analysis and assistance. Analysis the user wishes to perform can be described in a natural language sentence. The system understands the steps of analysis from the natural language sentence and assists the analysis. More specifically, the system automatically performs the analysis step while appropriately storing required information through interaction with the user and displays an analysis screen.

The user interface allows analysis situations, the relationship between words, and analyzed content to be intuitively understood using an analysis input screen, for displaying natural language sentence inputs and natural language sentence samples, and a mining screen for actual mining. The mining screen is made up of a mining graph screen for visualizing the interactive mining process, an analysis screen for displaying an optimal analysis dashboard from a current set of documents and the facets to be analyzed, and a facet screen for listing available facets.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

FIG. 1 shows an example of actual analysis processes. In this example, a user is assumed to analyze documents about vehicle failures to find out problems frequently occurring in a vehicle model (hereinafter referred to simply as a "model") and causes of the problems.

In the process #1, the user may first narrow down the documents using, as a query word, the model to be analyzed ("ABC" in this example), as indicated by a node 31. That is, the user may perform a facet search using a value "ABC" of a facet "Model." Hereinafter, the value of the facet is referred to as a "facet value," Next, the user may select a facet "Component" to be analyzed and perform a correlation analysis of the current documents with respect to the facet. In FIG. 1, a result of the correlation analysis is assumed to reveal that a facet value "Brake" is highly correlated to the model "ABC" among facet values of the facet "Component," as indicated by node 32. Thus, the user may further narrow down the current documents with the facet value "Brake" to find out why brakes have problems. That is, the user may perform a facet search using the facet value "Brake" of the facet "Component."

In the process #2, the user may narrow down the current documents with the facet value "Brake," as stated above regarding the last analysis step of the process #1. Next, the user may perform a correlation analysis of the current documents with respect to various facets (e.g., a noun, a state, and the like). In FIG. 1, a result of the correlation analysis is assumed to reveal that a facet value "Rust" is highly correlated to the facet value "Brake" among facet values of the facet "Noun," as indicated by node 33. Further, a result of the correlation analysis is assumed to reveal that a facet value "Northern" is highly correlated to the facet value "Brake" among facet values of the facet "State," as indicated by node 34. This is because salt is sprinkled to prevent road surfaces from being frozen in the northern states, and this makes brakes rusty.

However, assuming that the aforementioned text mining system is applied to such analysis processes, it is required to be improved in various respects. For example, the aforementioned text mining system is desired to suggest a facet that can be considered useful if statistical analysis is performed with respect to the facet. Further, since relationships between words and phrases obtained by narrowing-down and statistical analysis are important, the aforementioned text mining system is desired to enable a user to understand the relationships.

In view of this, the exemplary embodiments may provide a system that recognizes a user's intention to analyze the documents, analyzes the documents automatically, and assists the user in analyzing the documents. The system may further include a user interface that enables the user to intuitively understand analysis situations, relationships between analyzed words or phrases, and analysis results.

Figure 2:
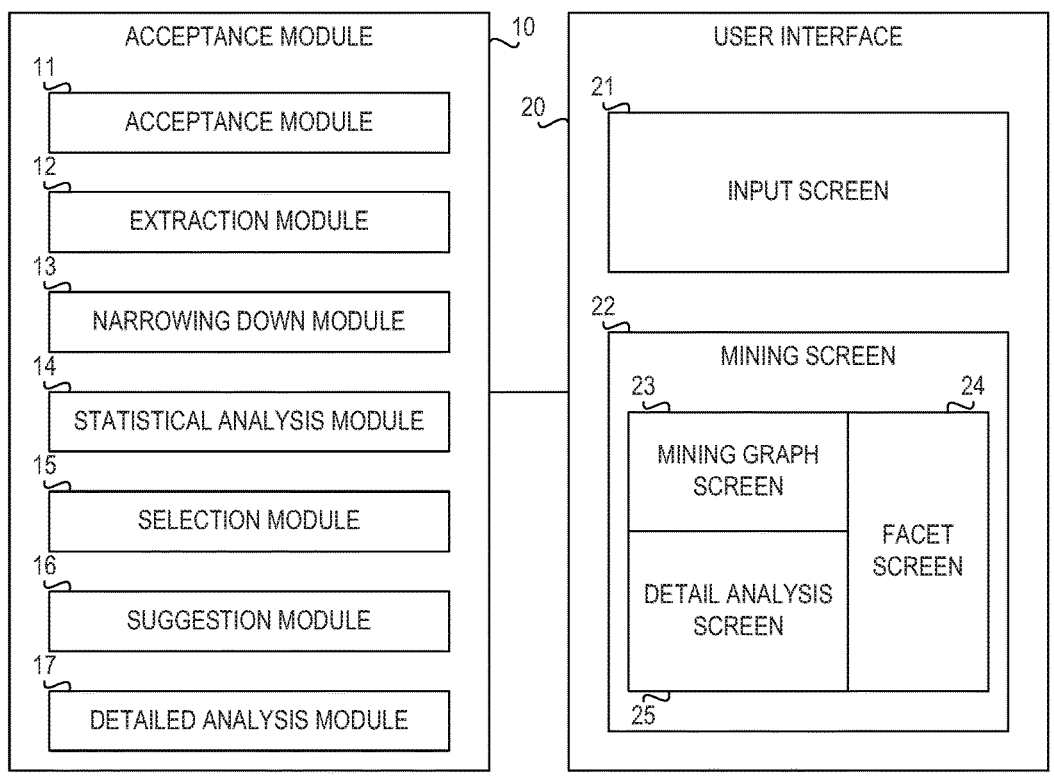
FIG. 2 depicts a block diagram of a document analysis system in accordance an illustrative embodiment.

FIG. 2 shows a block diagram of a document analysis system in accordance with an illustrative embodiment. As shown in the figure, the document analysis system may include a document analysis device 10 and a user interface 20. The document analysis device 10 may recognize a user's intention to analyze the documents, automatically analyze the documents, and assist the user in analyzing the documents.

That is, the document analysis device 10 may enable the user to describe an analysis that the user wishes to perform in a natural language sentence. The document analysis device 10 may understand analysis steps from the natural language sentence and assist the user in the analysis. More specifically, the document analysis device 10 may perform the analysis steps automatically while appropriately complementing required information through interaction with the user and display an analysis screen.

For example, in the abovementioned example, the user may input a natural language sentence "What Component is highly correlated to Model ABC and Why?" to the document analysis device 10. The document analysis device 10 may understand the natural language sentence and automatically execute process #1. Further, the document analysis device 10 may advance the processing to the process #2, suggest facets as candidates for an analysis axis if high correlation is likely to be detected with respect to the facets, and display the facets on the analysis screen.

As shown FIG. 2, the document analysis device 10 may include an acceptance module 11, an extraction module 12, a narrowing down module 13, a statistical analysis module 14, a selection module 15, a suggestion module 16, and a detail analysis module 17.

The acceptance module 11 may have predefined patterns of understandable natural language sentences and may understand a meaning of a given natural language sentence through pattern matching. The natural language sentence may basically represent one analysis process of interactive text mining. Thus, the natural language sentence may include a facet to be analyzed (hereinafter referred to as an "analysis facet"), a type of a statistical analysis to be used (hereinafter referred to as a "statistical analysis type"), and, if necessary, a query word or phrase for narrowing down the documents (hereinafter referred to as a "query"). The analysis facet may be included in the natural language sentence in the form of the name of the analysis facet. A list of the names of analysis facets are assumed to be provided by the user to the system in advance. Note that the analysis facet included in the natural language sentence serves as one example of a first facet. The statistical analysis type may also be included in the natural language sentence in the form of the name of the statistical analysis. Note that the statistical analysis of the type included in the natural language sentence serves as one example of a first statistical analysis.

If the natural language sentence includes an ambiguous query, the acceptance module 11 may display a screen for allowing the user to solve the ambiguity. For example, if the natural language sentence includes a query "ABC," the acceptance module 11 may display a screen for the user to determine which of a query of a facet "Model," a query of a facet "Noun," and a query for simple text search is the query "ABC" included in the natural language sentence.

In many analyses, one analysis process is insufficient for the interactive text mining, and two analysis processes are typically executed. The two analysis processes may include the first analysis process of narrowing down documents into interesting documents and identifying words specific to the interesting documents (corresponding to the process #1 of FIG. 1), and the second analysis process of identifying the cause for appearance of the words (corresponding to the process #2 of FIG. 1). Thus, in the preferred exemplary embodiment, the natural language sentence may include a specific word or phrase for designating an automatic analysis. Hereinafter, the specific word or phrase for designating an automatic analysis is referred to as an "automatic analysis designation." The automatic analysis designation may designate the system to execute the first analysis process and to present analysis facets that can be considered useful if statistical analysis is performed with respect to the facets in the second analysis process. For example, a phrase such as "and Why?" may be used as the automatic analysis designation.

The extraction module 12 may extract the analysis facet, the statistical analysis type, and the query. Further, the extraction module 12 may extract the automatic analysis designation from the natural language sentence if it is included in the natural language sentence. For example, the extraction module 12 may extract the analysis facet "Component," the statistical analysis type "Correlation analysis," and the query "ABC" of the facet "Model" from the natural language sentence "What Component is highly correlated to Model ABC?" The extraction module 12 may extract the analysis facet "Component," the statistical analysis type "Correlation analysis," the query "ABC" of the facet "Model," and the automatic analysis designation "and Why?" from the natural language sentence "What Component is highly correlated to Model ABC, and Why?" The extraction module 12 may extract the analysis facet "Product" and the statistical analysis type "Sentiment analysis" from the natural language sentence "What Product has the best sentiment?"

The narrowing down module 13 may narrow down the documents with the query extracted from the natural language sentence and treat the narrowed-down documents as the current documents. If no query has been extracted from the natural language sentence, the narrowing down module 13 may treat all the documents as the current documents.

The statistical analysis module 14 is assumed to hold a list of statistical analysis types and words or phrases associated with the statistical analysis types. For example, the statistical analysis module 14 may recognize a correlation analysis if a word "correlation" or its derived word is included in the natural language sentence and recognize a sentiment analysis if a word "sentiment" is included in the natural language sentence. If the automatic analysis designation is not extracted from the natural language sentence, the statistical analysis module 14 may perform the statistical analysis with respect to the analysis facet extracted from the natural language sentence and display a result of the statistical analysis on an analysis screen. If the automatic analysis designation is extracted from the natural language sentence, the statistical analysis module 14 may perform the statistical analysis with respect to the analysis facet extracted from the natural language sentence and proceed automatically to the next analysis process.

The selection module 15 may select a facet value based on the result of the statistical analysis using a predefined algorithm and narrow down the current documents with the selected facet value. Note that some algorithms can find plural candidates for the facet value, and the selection module 15 may display a screen prompting a user to select one of them. The selection module 15 may use information in the natural language sentence to select the algorithm. Specifically, the selection module 15 may use an adjective word or phrase, adverbial word or phrase, or the like, which modifies a word or phrase associated with the statistical analysis type. For example, if a phrase "the highest correlation" is included in the natural language sentence, the selection module 15 may select the facet value having the highest correlation indicator based on the result of the correlation analysis. If a phrase "highly correlated" is included in the natural language sentence, the selection module 15 may obtain facet values having the top three correlation indicators and present the facet values to the user. If a phrase "empirically correlated" is included in the natural language sentence, the selection module 15 may select the facet value which is empirically significant based on a result of software processing (e.g., machine learning of the past statistical analysis).

The suggestion module 16 may perform a statistical analysis of the current documents with respect to facets. The statistical analysis may be a default statistical analysis defined by the system. Further, the statistical analysis may be performed with respect to each of the facets defined by the system. The suggestion module 16 may present analysis facets, each of which includes many facet values having high statistical indicators, as analysis axes. Although assumed to perform the statistical analysis through a simple brute force algorithm, namely with respect to each of all the facets defined by the system, the suggestion module 16 may use another algorithm. Note that the statistical analysis performed by the suggestion module 16 serves as one example of a second statistical analysis, and an analysis facet presented by the suggestion module 16 serves as one example of a second facet.

The detail analysis module 17 may display a detailed result of the statistical analysis on a detail analysis screen. The analysis process may proceed to the third analysis process, the fourth analysis process, and so on by further narrowing down the current documents with a facet value selected on the detail analysis screen. In this case, the detail analysis module 17 may cause the selection module 15 and the suggestion module 16 to execute the same processing as in the second analysis process.

The user interface 20 may enable a user to intuitively understand analysis situations, relationships between analyzed words or phrases, and analysis results. As shown FIG. 2, the user interface 20 may include an input screen 21 and a mining screen 22. The input screen 21 may display the natural language sentence inputted by a user and natural sentence samples stored in the system in advance. The input screen 21 may be displayed as an initial screen, and changed to the mining screen 22 in response to designation of analysis through a natural language sentence.

The mining screen 22 may be operated for actual mining. The mining screen 22 may include a mining graph screen 23, a facet screen 24 and a detail analysis screen 25. The mining graph screen 23 may display mining graphs for visualizing interactive text mining processes. The facet screen 24 may display a list of available facets. The detail analysis screen 25 may display a dashboard obtained from the current documents and the analysis facets. Although the mining screen 22 initially has a layout as shown in FIG. 2, for example, the layout may be changed.

Figure 3:
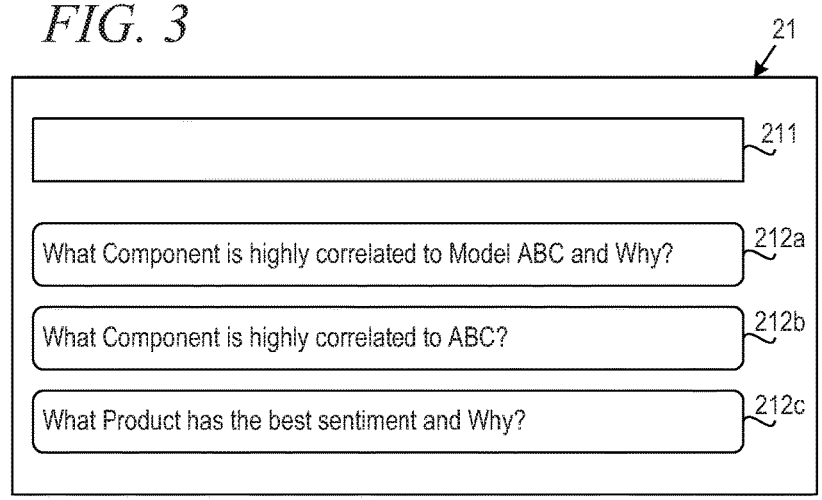
FIG. 3 depicts an example of an input screen in accordance with an illustrative embodiment.

FIG. 3 shows an example of the input screen 21 in accordance with an illustrative embodiment. As shown in the figure, the input screen 21 may include an input area 211, and sample display areas 212a to 212c. The user may start analysis by inputting a natural language sentence to the input area 211, or by selecting a natural language sentence sample displayed in any one of the sample display areas 212a to 212c. When the user inputs the natural language sentence to the input area 211, the natural language sentence may be verified against sentence patterns held by the system, and natural language sentence samples corresponding to matched sentence patterns may be displayed in the sample display areas 212a to 212c as candidates for the natural language sentence. The user may select one natural language sentence sample from among the candidates. When the input area 211 becomes void, an initial list of the natural language sentence samples may be displayed in the sample display areas 212a to 212c. Although the natural language sentence is assumed to be displayed basically in text as it is on the input screen 21, specific keywords, such as names of facets, may be visually highlighted. Further, a user interface may be provided on which a word representing the name of a facet or the name of a statistical analysis can simply be changed into another word.

Figure 4:
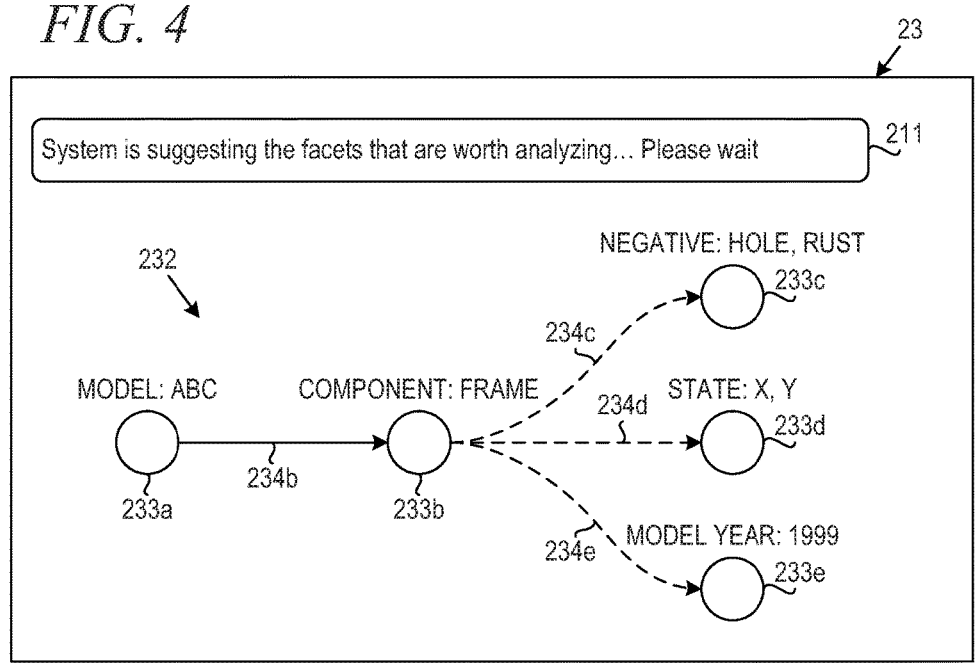
FIG. 4 depicts an example of a mining graph screen in accordance with an illustrative embodiment.

FIG. 4 shows an example of the mining graph screen 23 in accordance with an illustrative embodiment. As shown in the figure, the mining graph screen 23 may include a console 231 and a mining tree 232. The console 231 may issue notification on the current processing situations of the system. The mining tree 232 may visualize the current analysis situations. Upon selection of one of the natural language sentence samples on the input screen 21 of FIG. 3, this mining graph screen 23 may be displayed. The content of the console 231 and the mining tree 232 may be changed every time the analysis process changes.

For example, the mining tree 232 of FIG. 4 is assumed to be displayed when the natural language sentence "What Component is highly correlated to Model ABC and Why?" is selected. The mining tree 232 may include nodes 233a and 233b each indicating an analysis step with a query used at the step, and nodes 233c to 233e each indicating an analysis step with a facet value suggested at the step. Additional information such as the number of documents, a statistical indicator, a statistical analysis type, or the like may be displayed in association with each of the nodes 233a to 233e.

The mining tree 232 may include a link 234b between the nodes 233a and 233b. This link 234b is illustrated with a solid line to indicate that the documents have already been narrowed down with the query corresponding to the node 233b. The mining tree 232 may further include links 234c to 234e between the node 233b and the nodes 233c to 233e, respectively. These links 234c to 234e are illustrated with broken lines to indicate that the current documents are being analyzed with respect to facets, and the facets are presented as analysis facets each with a facet value having a high statistical indicator. Although assumed to be suggested by the system in the default case, the analysis facets may be designated by a user, or be replaced with an existing one.

The mining tree 232 of FIG. 4 indicates that a user has narrowed down the documents with a query "ABC" of a facet "Model" and has further narrowed down the current documents with a facet value "Frame" of a facet "Component." The mining tree 232 of FIG. 4 indicates that the current documents are being analyzed and analysis facets "Negative," "State," and "Model Year" are suggested. Note that although only one facet is assumed to be selected at the analysis step indicated by the node 233b in FIG. 4, plural facets may be selected at the step. Further, although only one facet value is assumed to be selected at the analysis step indicated by the node 233b in FIG. 4, plural facet values may be selected at the step.

The content of analysis may be changed on the mining graph screen 23. The user may be allowed to easily identify another value of the node by selecting the node. A user interface, such as a pop-up window, may be used to identify another value of the node. By changing the query which has already been used to narrow down the documents, the processing may be branched off to a new analysis process. For example, the facet value "Frame" of the facet "Component" may be changed to a facet value "Brake" of the facet "Component," and a new analysis process may be started. In this case, a new link may be established from the facet value "ABC" of the facet "Model," and an analysis process corresponding to the link may be treated as a new analysis process.

Figure 5:
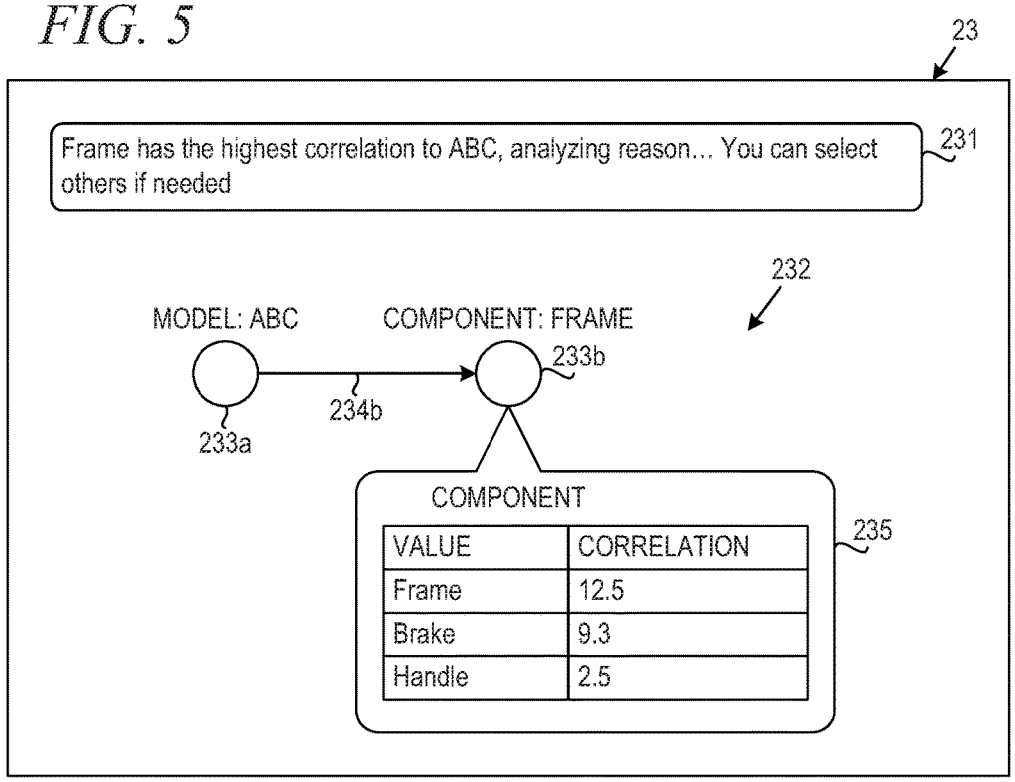
FIG. 5 depicts an example of a mining graph screen displayed when an automatic analysis designation is included in a natural language sentence in accordance with an illustrative embodiment.

FIG. 5 shows an example of the mining graph screen 23 displayed when the automatic analysis designation is included in the natural language sentence. The first analysis process may be automatically executed. If the automatic analysis designation is included in the natural language, the second analysis process may be basically automatically executed. However, some algorithms used by the system require a user to select one of plural facet values. In such cases, simple display of an analysis result may be presented around a node to allow the user's selection. For example, FIG. 5 shows a tooltip 235 for prompting a user to select one facet value from the top three facet values, in the situation where the natural language sentence "What Component is highly correlated to Model ABC and Why?" has been selected.

FIG. 6 shows an example of the facet screen 24 displayed in addition to the mining graph screen 23 in accordance with an illustrative embodiment. On the facet screen 24, a list of facets may be displayed. If the facets configure tree structures, the tree structures may be displayed. The facet screen 24 may provide a new facet to be added to already-displayed analysis facets on the mining graph screen 23 by a drag-and-drop operation. For example, in FIG. 6, an analysis facet 233f is added to the analysis facets 233c to 233e by a drag-and-drop operation, as indicated by an arrow 236. Alternatively, the facet screen 24 may provide a new facet with which an already-displayed analysis facet is to be replaced on the mining graph screen 23. The already-displayed analysis facet may be replaced with the new facet by overlaying it on the already-displayed analysis facet by a drag-and-drop operation. Note that such operation may be performed when the user feels that a suggested analysis facet is not useful or wishes to analyze a freely selected facet. Thus, a node representing the new facet may be displayed on the mining graph screen 23 with a facet value of the new facet having a high statistical indicator, as with the already-displayed analysis facets.

Figure 7:
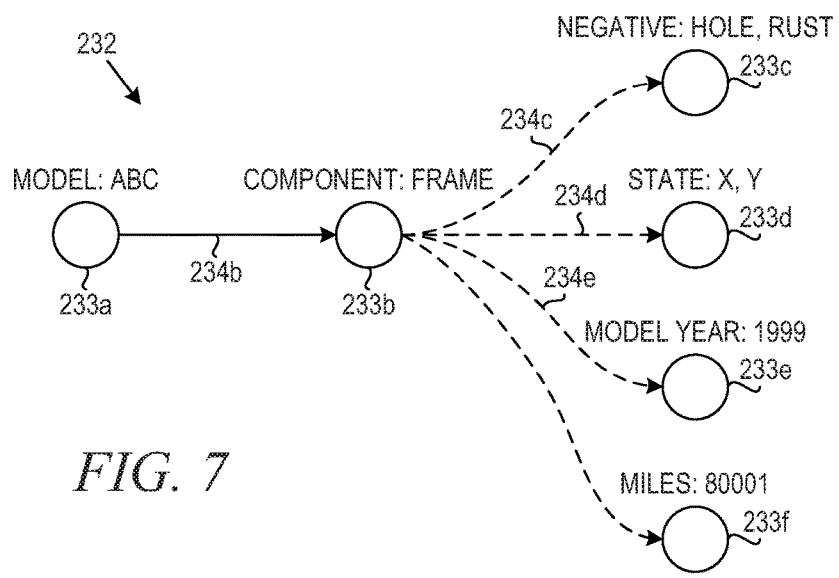
FIG. 7 depicts an example of the mining graph screen displayed immediately before a detail analysis screen is called in accordance with an illustrative embodiment.

Referring to FIG. 7, there is shown an example of the mining graph screen 23 displayed immediately before the detail analysis screen 25 is called in accordance with an illustrative embodiment. The detail analysis screen 25 may be displayed when the user selects by a click operation one or more nodes representing one or more analysis facets to be analyzed in detail and activates a trigger for transitioning to detailed analysis of the one or more analysis facets. In FIG. 7, a button 237 for opening the detail analysis screen 25 is assumed to be displayed in a state when the nodes 233c to 233f are selected as indicated by thick circular lines. Note that immediately after the analysis of the documents in response to the natural language sentence, the analysis facets represented by the nodes at the rightmost of the mining tree 232 may be automatically selected and displayed on the detail analysis screen 25.

Alternatively, the detail analysis screen 25 may be displayed when the user selects by a click operation one or more facet values of the one or more analysis facets, although this case is not shown in the figure. In this case, the current documents may be narrowed down with the selected one or more facet values, prior to the display of the detail analysis screen 25. For example, assuming that the facet value "Hole" of the analysis facet "Negative" is selected, the current documents may be narrowed down with the facet value "Hole," and subsequently the detail analysis screen 25 may be displayed.

Figure 8:
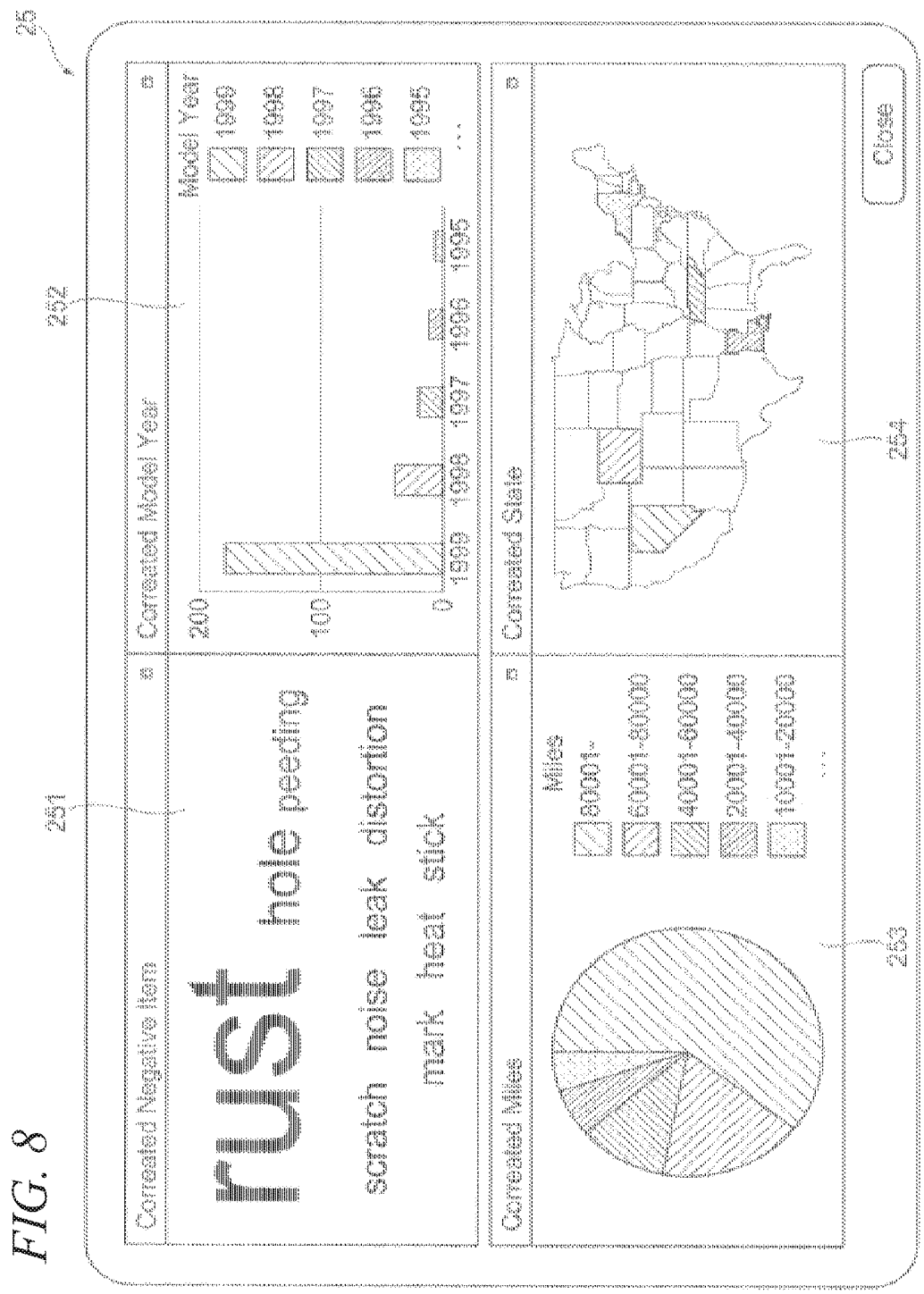
FIG. 8 depicts an example of a detail analysis screen in accordance with an illustrative embodiment.

FIG. 8 shows an example of the detail analysis screen 25 in accordance with an illustrative embodiment. The detail analysis screen 25 may be a dashboard on which a result of statistical analysis regarding the selected analysis facets is displayed. In FIG. 8, a word set 251, a bar graph 252, a circle graph 253, and a map 254 are displayed. For example, the map 254 may be used to display the result of statistical analysis regarding the analysis facets indicating a place name. Note that it is assumed that the system provides a certain rule associating analysis facets with display modes of the result of statistical analysis regarding the analysis facets.

The analysis facet may be changed by dragging and dropping a facet from the facet screen 24 to this detail analysis screen 25. Further, the statistical analysis type may be optionally changed through an arbitrary user interface.

If the user wishes to further analyze the current documents with respect to a facet value displayed on the detail analysis screen 25, the user can proceed to the next analysis step by selecting the facet value and narrowing down the current documents. Thus, the system may update the mining tree 232, and display one or more facets as the next analysis axis.

In FIG. 2, the mining screen 22 is assumed to be divided to show the detail analysis screen 25 together with the mining graph screen 23. However, the detail analysis screen 25 may be displayed in various display modes. For example, the detail analysis screen 25 may be displayed on the mining graph screen 23 as a dialog box. Alternatively, the detail analysis screen 25 may be displayed so that the mining graph screen 23 is changed to the detail analysis screen 25.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9A:
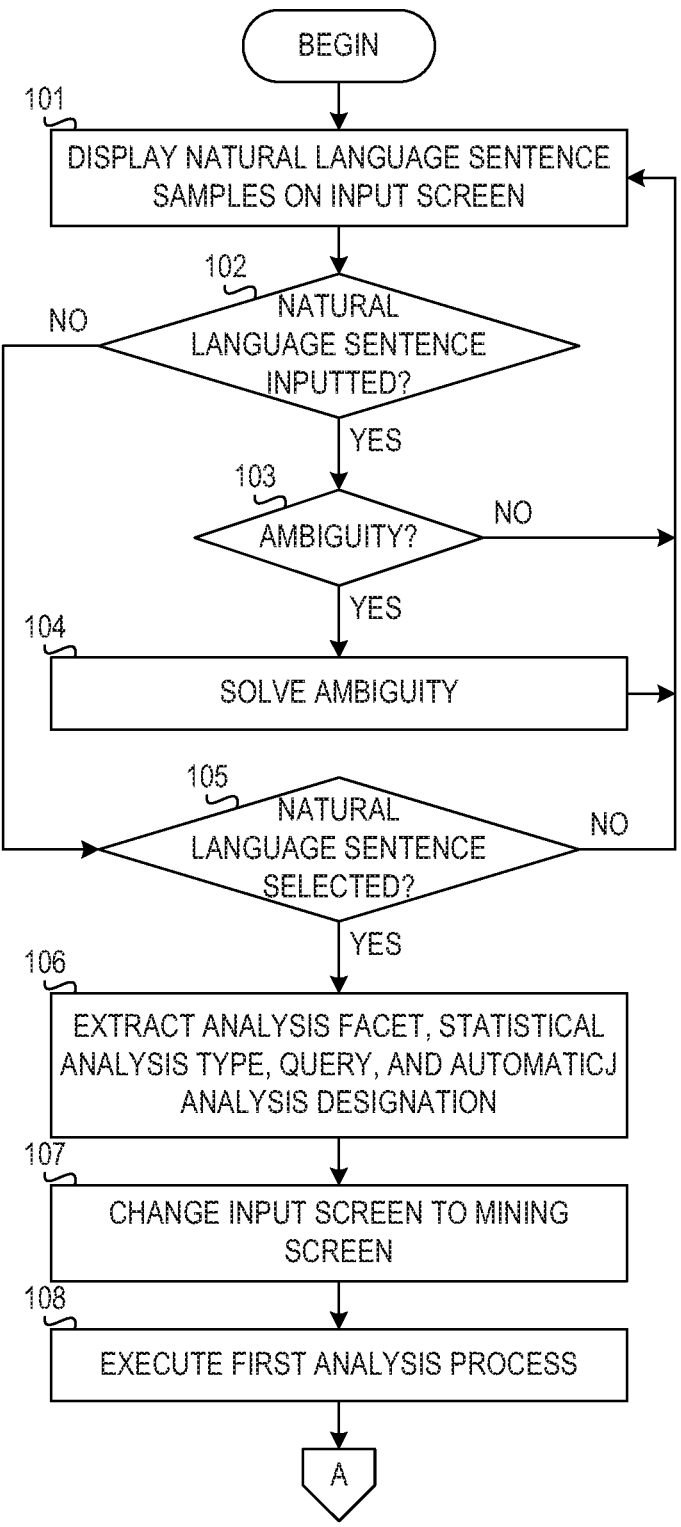
FIGS. 9A and 9B depict a flowchart representing an example of an operation of document analysis in accordance with an illustrative embodiment.
Figure 9B:
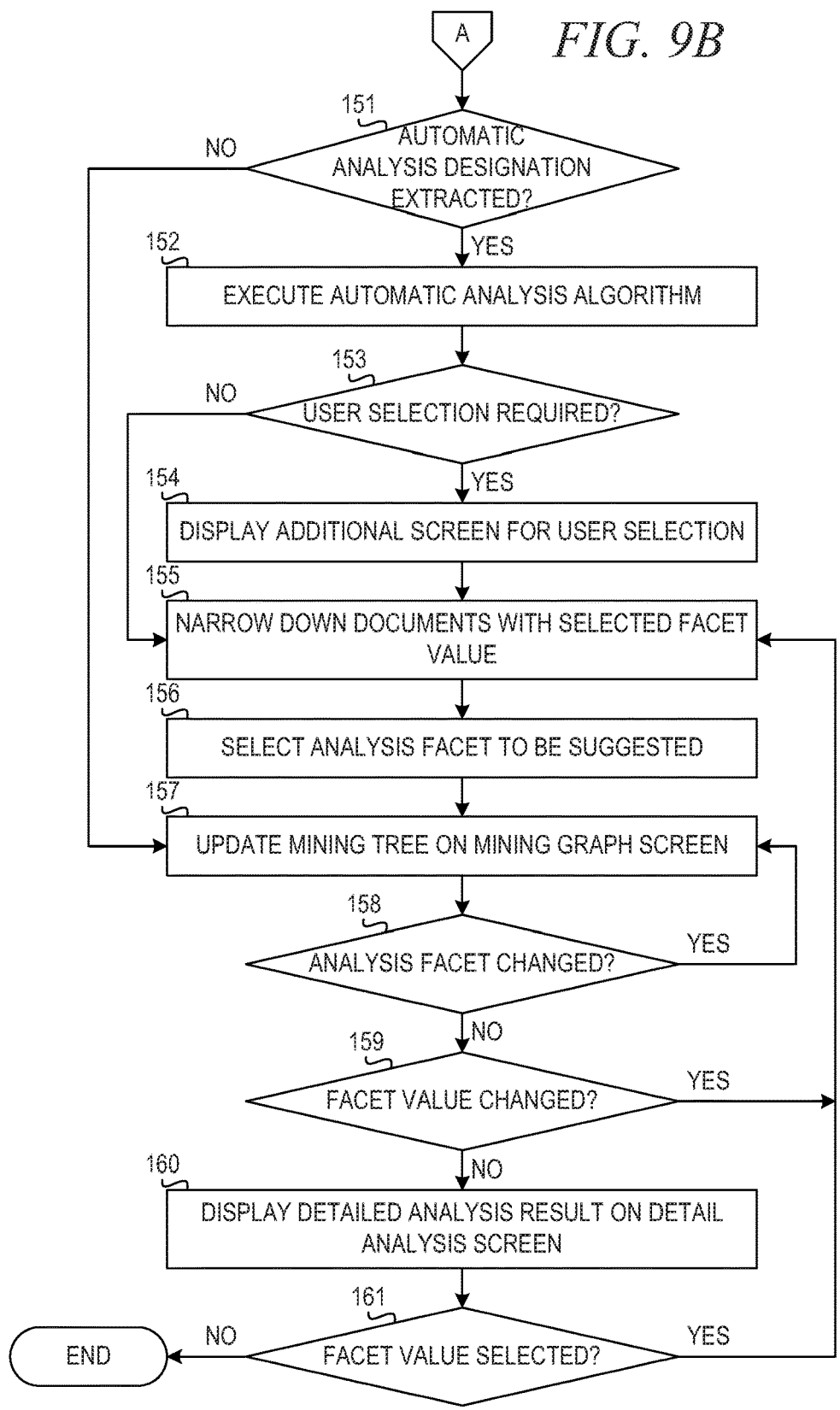

FIGS. 9A and 9B show a flowchart representing an example of the operation of the document analysis device 10 in accordance with an illustrative embodiment. Note that the documents to be analyzed are assumed to be stored in the storage of the document analysis device 10; however, the documents may be stored remotely from the document analysis device 10 depending on the implementation of the illustrative embodiment.

As shown in FIG. 9A, the acceptance module 11 may display natural language sentence samples in the sample display areas 212a to 212c of the input screen 21 (step 101). Then, the acceptance module 11 may determine whether or not a natural language sentence has been newly inputted in the input area 211 of the input screen 21 (step 102). If the natural language sentence has been newly inputted in the input area 211, the acceptance module 11 may further determine whether or not the natural language sentence has ambiguity (step 103). In particular, the acceptance module 11 may determine whether or not a query in the natural language sentence has ambiguity. If the natural language sentence has ambiguity, the acceptance module 11 may solve the ambiguity on an interaction screen (step 104), and return the processing to step 101 with the natural language sentence samples being updated based on the inputted natural language sentence. On the other hand, if, at step 103, the natural language sentence does not have ambiguity, the acceptance module 11 may return the processing to step 101 with the natural language sentence samples being updated based on the inputted natural language sentence without solving any ambiguity.

Meanwhile, if, at step 102, no natural language sentence has been newly inputted in the input area 211, the acceptance module 11 may determine whether or not a natural language sentence has been selected from plural natural language sentence samples displayed in the sample display areas 212a to 212c of the input screen 21 (step 105). If no natural language sentence has been selected, the acceptance module 11 may return the processing to step 101.

On the other hand, if, at step 105, a natural language sentence has been selected, the extraction module 11 may extract an analysis facet, a statistical analysis type, a query, and an automatic analysis designation from the natural language sentence (step 106). Note that the extraction module 11 may extract the automatic analysis designation if it is included in the natural language sentence. Then, the extraction module 11 may change the input screen 21 to the mining screen 22 (step 107).

Next, the document analysis device 10 may execute the first analysis process (step 108). Specifically, the narrowing down module 13 may narrow down the documents with the query extracted from the natural language sentence. Then, the statistical analysis module 14 may perform a statistical analysis of the type extracted from the natural language sentence and display a part of a mining tree 232 corresponding to the first analysis process on the mining graph screen 23.

Subsequently, as shown in FIG. 9B, the selection module 15 may determine whether or not the automatic analysis designation has been extracted from the natural language sentence (step 151). If the automatic analysis designation has been extracted from the natural language sentence, the selection module 15 may execute an automatic analysis algorithm (step 152). This automatic analysis algorithm may be determined based on a specific word or phrase modifying the statistical analysis type in the natural language sentence. Then, the selection module 15 may determine whether or not the automatic analysis algorithm requires user selection (step 153). If the automatic analysis algorithm requires user selection, the selection module 15 may display an additional screen for the user selection (step 154). For example, the additional screen may include plural facet values of the analysis facet extracted from the natural language sentence. In response to selection of a facet value by a user, the selection module 15 may narrow down the current documents with the selected facet value (step 155). If, at step 153, the automatic analysis algorithm does not require user selection, the selection module 15 may narrow down the current documents with the facet value selected by itself without requiring user selection in step 155.

Next, the suggestion module 16 may select at least one analysis facet to be suggested (step 156). Specifically, the suggestion module 16 may perform a predetermined statistical analysis of the current documents with respect to each of the facets prepared by the document analysis device 10. Then, the suggestion module 16 may select at least one facet each of which includes many facet values having high statistical indicators. After that, the suggestion module 16 may update the mining tree 232 on the mining graph screen 23 (step 157). Returning to step 151, if the automatic analysis designation has not been extracted from the natural language sentence, operation proceeds to step 157 where the suggestion module 16 may update the mining tree 232 on the mining graph screen 23.

In this state, various operations are made to the mining tree 232. Thus, the acceptance module 11 may determine whether or not the selected analysis facet has been changed (step 158). Specifically, the acceptance module 11 may determine whether or not a new analysis facet has been selected on the facet screen 24 by the user instead of the analysis facet selected at step 156. If the selected analysis facet has been changed, the acceptance module 11 may return the processing to step 157. If the selected analysis facet has not been changed at step 158, the acceptance module 11 may further determine whether or not the selected facet value has been changed (step 159). Specifically, the acceptance module 11 may determine whether or not a new facet value has been selected on the mining tree 232 by the user instead of the facet value selected at step 154. If the selected facet value has been changed, the acceptance module 11 may return the processing to step 155. If, at step 159, the selected facet value has not been changed, the acceptance module 11 may advance the processing to step 160.

That is, the detail analysis module 17 may display a detailed analysis result on the detail analysis screen 25 (step 160). For example, the detailed analysis module 17 may display the detailed analysis result in response to a click operation of a button on the detail analysis screen 25. Alternatively, the detail analysis module 17 may display the detailed analysis result in response to a click operation of one or more facet values of the suggested one or more analysis facets. In this case, the current documents may be narrowed down with the one or more facet values, prior to the display of the detailed analysis result on the detail analysis screen 25.

Also in this state, various operations are made to the detailed analysis result. Thus, the acceptance module 11 may determine whether or not the facet value has been selected (step 161). Specifically, the acceptance module 11 may determine whether or not a new facet value has been selected on the detail analysis screen 25 by the user instead of the facet value selected at step 154. If the facet value has been selected, the acceptance module 11 may return the processing to step 155. If, at step 161, the facet value has not been selected, the acceptance module 11 may end the processing.

In the first alternative exemplary embodiment, the natural language sentence is assumed to include no specific word or phrase modifying the statistical analysis type. In this case, the selection module 15 may execute a default automatic analysis algorithm defined by the system. For example, the selection module 15 may select the facet value having the highest correlation indicator based on the result of the correlation analysis. Alternatively, the selection module 15 may obtain facet values having the top three correlation indicators and present the facet values to the user. Further, the selection module 15 may select the facet value which is empirically significant based on a result of software processing (e.g., machine learning of the past statistical analysis)).

Next, the second alternative exemplary embodiment will be described. In the second alternative exemplary embodiment, the suggestion module 16 is assumed to perform a statistical analysis other than the default statistical analysis defined by the system. For example, the suggestion module 16 may perform a statistical analysis of a type selected from plural types based on results of statistical analyses of the plural types. Alternatively, the suggestion module 16 may perform a statistical analysis of the same type as the statistical analysis type extracted from the natural language sentence.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
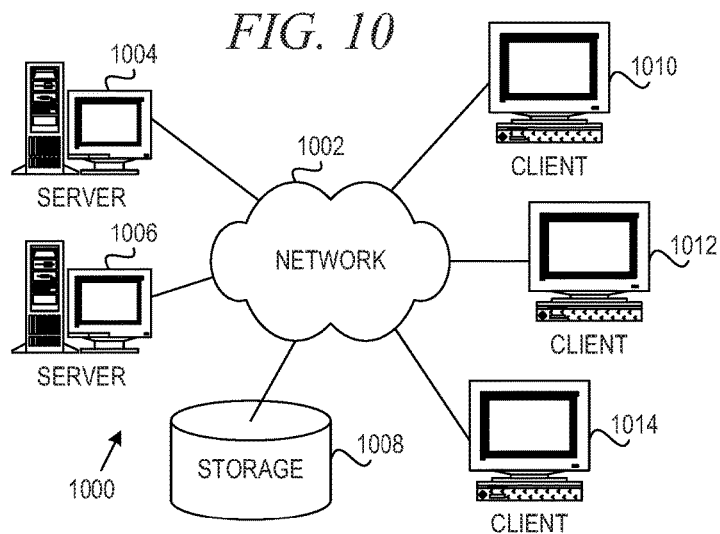
FIG. 10 depicts a pictorial representation of an example distributed data processing system in which aspects of the illustrative embodiments may be implemented.
Figure 11:
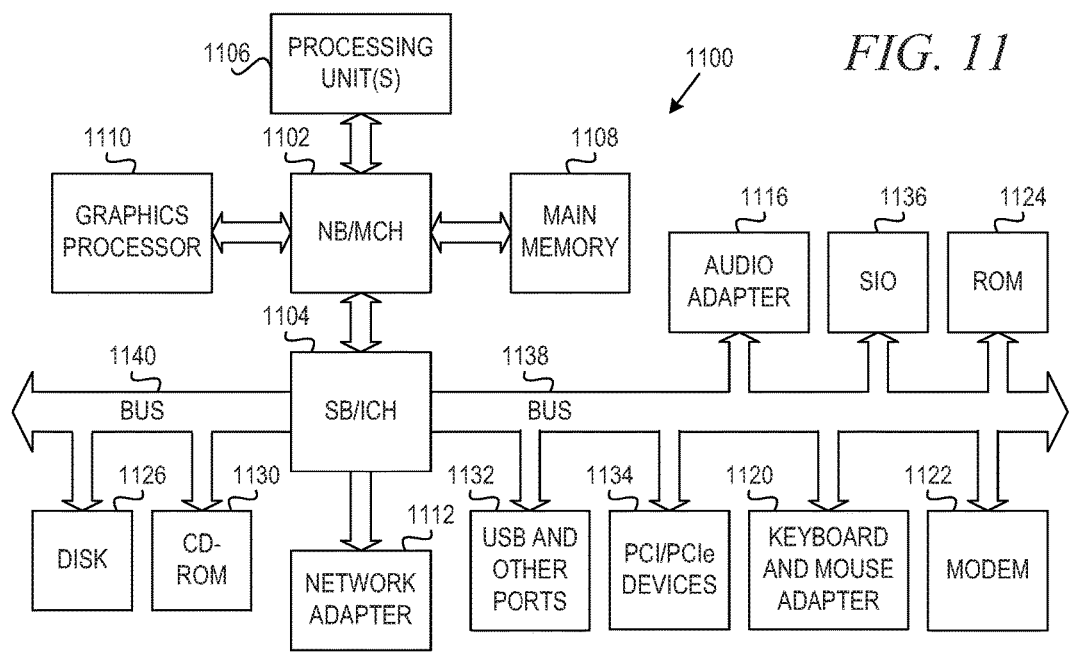
FIG. 11 is a block diagram of just one example data processing system in which aspects of the illustrative embodiments may be implemented.

The illustrative embodiments may be utilized in many different types of data processing environments. In order to provide a context for the description of the specific elements and functionality of the illustrative embodiments, FIGS. 10 and 11 are provided hereafter as example environments in which aspects of the illustrative embodiments may be implemented. It should be appreciated that FIGS. 10 and 11 are only examples and are not intended to assert or imply any limitation with regard to the environments in which aspects or embodiments of the present invention may be implemented. Many modifications to the depicted environments may be made without departing from the spirit and scope of the present invention, FIG. 10 depicts a pictorial representation of an example distributed data processing system in which aspects of the illustrative embodiments may be implemented. Distributed data processing system 1000 may include a network of computers in which aspects of the illustrative embodiments may be implemented. The distributed data processing system 1000 contains at least one network 1002, which is the medium used to provide communication links between various devices and computers connected together within distributed data processing system 1000. The network 1002 may include connections, such as wire, wireless communication links, or fiber optic cables.

In the depicted example, server 1004 and server 1006 are connected to network 1002 along with storage unit 1008. In addition, clients 1010, 1012, and 1014 are also connected to network 1002. These clients 1010, 1012, and 1014 may be, for example, personal computers, network computers, or the like. In the depicted example, server 1004 provides data, such as boot files, operating system images, and applications to the clients 1010, 1012, and 1014. Clients 1010, 1012, and 1014 are clients to server 1004 in the depicted example. Distributed data processing system 1000 may include additional servers, clients, and other devices not shown.

In the depicted example, distributed data processing system 1000 is the Internet with network 1002 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 1000 may also be implemented to include a number of different types of networks, such as for example, an intranet, a local area network (LAN), a wide area network (WAN), or the like. As stated above, FIG. 10 is intended as an example, not as an architectural limitation for different embodiments of the present invention, and therefore, the particular elements shown in FIG. 10 should not be considered limiting with regard to the environments in which the illustrative embodiments of the present invention may be implemented.

As shown in FIG. 10, one or more of the computing devices, e.g., server 104, may be specifically configured to implement a system and user interface to support the interactive text mining process with natural language dialogue. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates interactive text mining with natural language dialogue.

As noted above, the mechanisms of the illustrative embodiments utilize specifically configured computing devices, or data processing systems, to perform the operations for supporting interactive text mining processes with natural language dialogue. These computing devices, or data processing systems, may comprise various hardware elements which are specifically configured, either through hardware configuration, software configuration, or a combination of hardware and software configuration, to implement one or more of the systems/subsystems described herein. FIG. 11 is a block diagram of just one example of a data processing system in which aspects of the illustrative embodiments may be implemented. Data processing system 1100 is an example of a computer, such as server 1004 in FIG. 10, in which computer usable code or instructions implementing the processes and aspects of the illustrative embodiments of the present invention may be located and/or executed so as to achieve the operation, output, and external effects of the illustrative embodiments as described herein.

In the depicted example, data processing system 1100 employs a hub architecture including north bridge and memory controller hub (NB/MCH) 1102 and south bridge and input/output (I/O) controller huh (SB/ICH) 1104. Processing unit 1106, main memory 1108, and graphics processor 1110 are connected to NB/MCH 1102. Graphics processor 1110 may be connected to NB/MCH 1102 through an accelerated graphics port (AGP).

In the depicted example, local area network (LAN) adapter 1112 connects to SB/ICH 1104. Audio adapter 1116, keyboard and mouse adapter 1120, modem 1122, read only memory (ROM) 1124, hard disk drive (HDD) 1126, CD-ROM drive 1130, universal serial bus (USB) ports and other communication ports 1132, and PCI/PCIe devices 1134 connect to SB/ICH 1104 through bus 1138 and bus 1140. PCI/PCIe devices may include, for example, Ethernet adapters, add-in cards, and PC cards for notebook computers. PCI uses a card bus controller, while PCIe does not. ROM 1124 may be, for example, a flash basic input/output system (BIOS).

HDD 1126 and CD-ROM drive 1130 connect to SB/ICH 1104 through bus 1140. HDD 1126 and CD-ROM drive 1130 may use, for example, an integrated drive electronics (IDE) or serial advanced technology attachment (SATA) interface. Super I/O (SIO) device 1136 may be connected to SB/ICH 1104.

An operating system runs on processing unit 1106. The operating system coordinates and provides control of various components within the data processing system 1100 in FIG. 11. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 1100.

As a server, data processing system 1100 may be, for example, an IBM eServer™ System P® computer system, Power™ processor based computer system, or the like, running the Advanced Interactive Executive (AIX®) operating system or the LINUX® operating system. Data processing system 1100 may be a symmetric multiprocessor (SMP) system including a plurality of processors in processing unit 1106. Alternatively, a single processor system may be employed.

Instructions for the operating system, the object-oriented programming system, and applications or programs are located on storage devices, such as HDD 1126, and may be loaded into main memory 1108 for execution by processing unit 1106. The processes for illustrative embodiments of the present invention may be performed by processing unit 1106 using computer usable program code, which may be located in a memory such as, for example, main memory 1108, ROM 1124, or in one or more peripheral devices 1126 and 1130, for example.

A bus system, such as bus 1138 or bus 1140 as shown in FIG. 11, may be comprised of one or more buses. Of course, the bus system may be implemented using any type of communication fabric or architecture that provides for a transfer of data between different components or devices attached to the fabric or architecture. A communication unit, such as modem 1122 or network adapter 1112 of FIG. 11, may include one or more devices used to transmit and receive data. A memory may be, for example, main memory 1108, ROM 1124, or a cache such as found in NB/MCH 1102 in FIG. 11.

As mentioned above, in some illustrative embodiments the mechanisms of the illustrative embodiments may be implemented as application specific hardware, firmware, or the like, application software stored in a storage device, such as HDD 1126 and loaded into memory, such as main memory 1108, for executed by one or more hardware processors, such as processing unit 1106, or the like. As such, the computing device shown in FIG. 11 becomes specifically configured to implement the mechanisms of the illustrative embodiments and specifically configured to perform the operations and generate the outputs described hereafter with regard to the mechanisms for supporting interactive text mining with natural language dialogue.

Those of ordinary skill in the art will appreciate that the hardware in FIGS. 10 and 11 may vary depending on the implementation. Other internal hardware or peripheral devices, such as flash memory, equivalent non-volatile memory, or optical disk drives and the like, may be used in addition to or in place of the hardware depicted in FIGS. 10 and 11. Also, the processes of the illustrative embodiments may be applied to a multiprocessor data processing system, other than the SMP system mentioned previously, without departing from the spirit and scope of the present invention.

Moreover, the data processing system 1100 may take the form of any of a number of different data processing systems including client computing devices, server computing devices, a tablet computer, laptop computer, telephone or other communication device, a personal digital assistant (PDA), or the like. In some illustrative examples, data processing system 1100 may be a portable computing device that is configured with flash memory to provide non-volatile memory for storing operating system files and/or user-generated data, for example. Essentially, data processing system 1100 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, hulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art, to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to implement a document analysis device for performing a statistical analysis of documents with respect to a facet, the method comprising:
   accepting, by an acceptance module executing within the document analysis device, a natural language sentence;
   extracting, by an extraction module executing within the document analysis device, a first facet from the natural language sentence;
   performing, by a statistical analysis module executing within the document analysis device, a first statistical analysis of a set of documents with respect to the first facet;
   determining, by the statistical analysis module, a value of the first facet based on a result of the first statistical analysis responsive to information being extracted from the natural language sentence, the information requesting for a second statistical analysis;

performing, by the statistical analysis module, the second statistical analysis of the set of documents using the value of the first facet; and presenting, by a user interface executed by the data processing system, a second facet determined based on a result of the second statistical analysis.

2. The method of claim 1, wherein extracting the first facet from the natural language sentence comprises extracting a query word or phrase from the natural language sentence and wherein performing the first statistical analysis comprises narrowing down the set of documents using the query word or phrase extracted from the natural language sentence.

3. The method of claim 1, wherein extracting the first facet from the natural language sentence comprises extracting a type of the first statistical analysis from the natural language sentence and wherein performing the first statistical analysis comprises performing the first statistical analysis of the type extracted from the natural language sentence.

4. The method of claim 1, wherein extracting the first facet from the natural language sentence comprises extracting an algorithm for determining the value of the first facet and wherein determining the value of the first facet comprises determining the value of the first facet using the algorithm extracted from the natural language sentence.

5. The method of claim 1, wherein determining the value of the first facet comprises selecting the value of the first facet from a plurality of values of the first facet, the selected value causing the result of the first statistical analysis to be highest.

6. The method of claim 1, wherein determining the value of the first facet comprises receiving from a user a selection of the value of the first facet from a plurality of values of the first facet via the user interface.

7. The method of claim 1, wherein determining the value of the first facet comprises selecting, by a suggestion module executing within the document analysis device, the value of the first facet from a plurality of values of the first facet.

8. The method of claim 1, wherein the second statistical analysis is a statistical analysis of a predetermined type.

9. The method of claim 1, wherein the second statistical analysis is a statistical analysis of a type selected from a plurality of types based on results of statistical analyses of the plurality of types.

10. The method of claim 1, wherein the second statistical analysis is a statistical analysis of a same type as a type of the first statistical analysis.

\* \* \* \* \*